(12) United States Patent
Mylaraswamy et al.

(10) Patent No.: US 10,427,797 B2
(45) Date of Patent: Oct. 1, 2019

(54) SYSTEMS AND METHODS FOR REDUCING ENVIRONMENTAL CONTROL SYSTEM MAINTENANCE

(71) Applicants: Honeywell International Inc., Morris Plains, NJ (US); Dinkar Mylaraswamy, Fridley, MN (US); C. Arthur Dins, Shanghai (CN); Qixiang Li, Beijing (CN); Eric Blumer, Scottsdale, AZ (US); Garry H Lee, Beijing (CN); Henry Claeys, Rancho Palos Verdes, CA (US); Michael Easley, Tempe, AZ (US)

(72) Inventors: Dinkar Mylaraswamy, Fridley, MN (US); C. Arthur Dins, Shanghai (CN); Qixiang Li, Beijing (CN); Eric Blumer, Scottsdale, AZ (US); Garry H Lee, Beijing (CN); Henry Claeys, Rancho Palos Verdes, CA (US); Michael Easley, Tempe, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 82 days.

(21) Appl. No.: 15/541,258

(22) PCT Filed: Jan. 20, 2017

(86) PCT No.: PCT/CN2017/071814
§ 371 (c)(1),
(2) Date: Jun. 30, 2017

(87) PCT Pub. No.: WO2018/133016
PCT Pub. Date: Jul. 26, 2018

(65) Prior Publication Data
US 2018/0257785 A1 Sep. 13, 2018

(51) Int. Cl.
*B64D 13/08* (2006.01)
*B64D 13/06* (2006.01)

(52) U.S. Cl.
CPC ............ *B64D 13/08* (2013.01); *B64D 13/06* (2013.01); *B64D 2013/0618* (2013.01)

(58) Field of Classification Search
CPC . B64D 13/08; B64D 13/06; B64D 2013/0618
See application file for complete search history.

(56) References Cited

U.S. PATENT DOCUMENTS

| 4,702,753 A | * | 10/1987 | Kowalczyk | .......... B01D 46/002 96/117.5 |
| 5,725,425 A | * | 3/1998 | Rump | .................... B60H 1/008 165/249 |

(Continued)

FOREIGN PATENT DOCUMENTS

| CN | 103574836 | 2/2014 |
| CN | 105329069 | 2/2016 |

OTHER PUBLICATIONS

International Searching Authority, "International Search Report and the Written Opinion for PCT/CN2017/071814", "Foreign Counterpart to U.S. Appl. No. 15/541,258", dated Oct. 26, 2017, pp. 1-11, Published in: WO.

(Continued)

*Primary Examiner* — Russell Frejd
(74) *Attorney, Agent, or Firm* — Bookoff McAndrews, PLLC

(57) ABSTRACT

In one embodiment, a method is provided. The method comprises: receiving, in a vehicle, at least one pollution parameter; and adjusting at least one fluid flow regulating mechanism position, to regulate an intake of pollutants into an environmental control system of the vehicle, based upon the at least one pollution parameter.

20 Claims, 9 Drawing Sheets

(56) References Cited

U.S. PATENT DOCUMENTS

| | | | |
|---|---|---|---|
| 5,938,527 A | 8/1999 | Oshima et al. | |
| 5,968,214 A * | 10/1999 | Nagata | B01D 53/0446 422/120 |
| 6,004,382 A * | 12/1999 | Pikesh | B01D 45/14 55/385.3 |
| 6,093,097 A * | 7/2000 | Cho | F24F 1/0007 454/233 |
| 6,514,138 B2 | 2/2003 | Estepp | |
| 6,629,886 B1 | 10/2003 | Estepp | |
| 6,723,146 B2 * | 4/2004 | Ninomiya | B60H 1/00457 454/158 |
| 6,769,979 B2 * | 8/2004 | Abe | B60H 3/00 454/156 |
| 7,013,656 B2 * | 3/2006 | Yanagimachi | B60H 1/00742 165/202 |
| 2009/0312905 A1 * | 12/2009 | Marra | B60H 1/00792 701/36 |
| 2010/0047115 A1 * | 2/2010 | Krichtafovitch | A61L 9/16 422/4 |
| 2010/0236770 A1 * | 9/2010 | Pursifull | B60H 1/00764 165/202 |
| 2011/0081285 A1 | 4/2011 | Vij | |
| 2014/0330459 A1 * | 11/2014 | Baumgardner | G01N 21/00 701/14 |
| 2015/0032266 A1 * | 1/2015 | Weast | B60H 1/008 700/276 |
| 2016/0097311 A1 * | 4/2016 | Coelho Ferreira | F01N 3/035 422/168 |
| 2016/0123643 A1 | 5/2016 | Jokinen | |
| 2016/0288043 A1 * | 10/2016 | Meirav | B01D 53/66 |
| 2017/0003080 A1 * | 1/2017 | Whaites | B64D 13/00 |
| 2017/0268396 A1 * | 9/2017 | Duan | B01D 47/02 |
| 2018/0037093 A1 * | 2/2018 | Newman | B60H 3/0078 |

OTHER PUBLICATIONS

Dins et al., "Maintenance Systems and Methods for ECS Elements", "U.S. Appl. No. 15/202,681, filed Jul. 6, 2016", Jul. 6, 2016, pp. 1-27, Published in: US.

* cited by examiner

US 10,427,797 B2

SYSTEMS AND METHODS FOR REDUCING ENVIRONMENTAL CONTROL SYSTEM MAINTENANCE

PRIORITY CLAIM

This application claims priority to International Patent Application No. PCT/CN2017/071814 filed on Jan. 20, 2017.

BACKGROUND

Aircraft include environmental control systems that condition and filter the air to supply to occupied interior spaces which house passengers, crew, and/or electronic equipment. Hereafter, such occupied interior spaces shall be collectively referred to as the "cabin." The environmental control system controls cabin temperature by regulating the temperature of the air supplied to the cabin. The air temperature supplied to the cabin is regulated, at least in part, by utilizing air from the exterior of the aircraft which passes through one or more heat exchangers in the environmental control system.

Aircraft operate in various geographical areas, including those with elevated levels of pollution. Pollutants include particulates, such as dust and ash, and compounds such as sulfur oxides, nitrogen oxides, carbon monoxide, and volatile organic compounds. Over time, pollutants accumulate in the environmental control system, and particularly in the heat exchanger. Over time the accumulated pollutants reduce the heat transfer efficiency of the one or more heat exchangers. Other components in the environmental control may have to work harder to provide the desired temperature air to the cabin; this undermines the reliability of such other components. Also, the pollutants may corrode the one or more heat exchangers and possibly other components of the environmental control system. As a result, the environmental control system becomes more inefficient and unreliable. This can lead to occupant discomfort in the cabin.

Because of pollution, environmental control system components, such as the one or more heat exchangers, must be periodically serviced or replaced. Such maintenance increases cost, not only due to the maintenance, but also because the aircraft is out of service. Accordingly, it is desirable to increase the time period between such maintenance.

SUMMARY

In one embodiment, a method is provided. The method comprises: receiving, in a vehicle, at least one pollution parameter; and adjusting at least one fluid flow regulating mechanism position, to regulate an intake of pollutants into an environmental control system of the vehicle, based upon the at least one pollution parameter.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
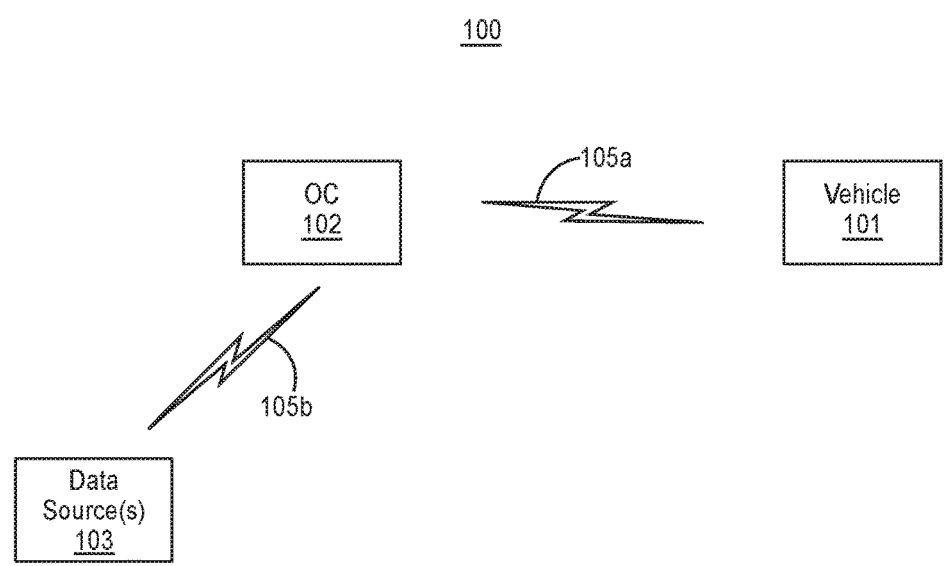
FIG. 1 is a block diagram of an exemplary system for extending the lifetime of at least one heat exchanger in a vehicle.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

For pedagogical purposes, a vehicle may be described hereinafter as an aircraft. However, it is understood that the teachings herein are applicable to other types of vehicles including without limitation space craft, ships, automobiles, buses, trains, and any other vehicle. Thus, a pilot of an aircraft is more generically referred to as an operator of a vehicle 101. An airline is more generically referred to as an owner of a vehicle. A flight plan of an aircraft is more generically referred to as a travel path of the vehicle.

In one embodiment, a vehicle and/or its operator receives data about actual or expected presence of pollutants, e.g. prior to or during its travel. Such data may be provided by (a) an external source, i.e. external to the vehicle such as an operations center, and/or (b) at least one particle sensor, such as a laser particle sensor, on or in the vehicle. If the vehicle and/or its operator is notified of the presence of pollution, then the vehicle automatically, or its operator manually, adjusts the operation of a fluid flow regulating mechanism, e.g. a door or louvers, controlling the amount of exterior fluid flow, e.g. air flow, including pollutants to reduce the flow of pollutants to at least one heat exchanger. In a further embodiment, the normal operation of the fluid flow regulating mechanism is overridden by the operator or the vehicle. Thus, the buildup of pollutants and corrosion of the at least one heat exchanger can be diminished.

In one embodiment, because most pollution is at an altitude of less than two kilometers, the functionality in the vehicle, such as an aircraft, described herein may only be enabled when the vehicle is parked at, arriving at, and departing from a terminal, e.g. an airport; however, in another embodiment, the functionality in the vehicle may be otherwise enabled (e.g. manually or automatically) because of the presence of other pollutants such as volcanic ash at higher altitudes. In a further embodiment, alternatively, the functionality may be enabled whenever the vehicle is in operation.

In one embodiment, based upon the actual or expected presence of pollutants, the external source provides control data that directly controls the operation of the fluid flow regulating mechanism to reduce the flow of pollutants to the at least one heat exchanger. By providing control data, rather than pollution data, techniques for converting the pollution data to fluid flow regulating mechanism control data can be changed at the external source without recertifying the corresponding vehicle or vehicle components.

In one embodiment, the provision of such data is done on a subscription basis. Thus, the owner or operator of the vehicle may pay a subscription fee periodically to the service provider to be a subscriber to receive such data, e.g. from the external source.

FIG. 1 is a block diagram of an exemplary system 100 for extending the lifetime of at least one heat exchanger in a vehicle 101. FIG. 1 illustrates a vehicle 101, an operations center (OC) 102, data sources 103, a first communications link 105a, and a second communications link 105b. The vehicle 101 is coupled to the operations center 102 by the first communications link 105a; the vehicle 101 and operations center 102 communicate through the first communications link 105a.

In one embodiment, such first communications link 105a is a secure communications link, e.g. using encryption, such as with a virtual private network. The secure communications link would reduce the risk of another deleteriously manipulating or mimicking data communicated between the vehicle 101 and operations center 102. In another embodiment, the vehicle 101 may access data from the operations center 102 using a uniform resource locator (URL) or an Internet Protocol (IP) address. In a further embodiment, the vehicle may access data from the operations center 102 using an application programming interface (API).

In one embodiment, the vehicle 101 is configured to communicate, and possibly confirm, requests, e.g. to the operations center 102, for data corresponding to pollutant levels along its travel path. In another embodiment, the vehicle 101 is configured to provide data to confirm that the vehicle 101, or its owner or operator are subscribers to the service provided by the operations center 102. In a further embodiment, such confirmatory data is a vehicle identifier, such as a tail plane number for an aircraft. In yet another embodiment, the vehicle 101 communicates pollution data (or at least one pollution parameter) to the operations center 102.

The operations center 102 is configured to provide the vehicle 101 with data corresponding to pollutant levels along the travel path, and/or the present location, of the vehicle 101. The vehicle 101 can use such data to regulate the intake of pollutants into the environmental control system of the vehicle 101. When the vehicle 101 is in the regions identified as having high pollutant levels, the vehicle 101 can reduce exterior fluid flow intake, and thus pollutant intake, into the environmental control system (ECS). In one embodiment, the operations center 102 utilizes location of the vehicle 101 and data about the pollutant level along the travel path of the vehicle 101 to generate data used to directly control the fluid flow regulating mechanism which regulates the flow of exterior fluid flow including pollutants. In another embodiment, the operations center 102 may be a cloud computing facility. In a further embodiment, the first communications link 105a may be a satellite, HF, VHF, cellular telephone, WiFi, WiMax, and/or any other type of communications link.

In one embodiment, the operations center 102 is coupled by the second communications link 105b to at least one data source 103 that provides pollution data; the operations center and the at least one data source 103 communicate through the second communications link 105b. In another embodiment, the second communications link 105b may be a wide area network, such as the Internet, and/or any other type of communications link.

Pollution data generally refers to data representing the nature of pollutants in a particular area. In one embodiment, the at least one data source 103 is Moderate Resolution Imaging Spectroradiometer (MODIS) data maintained by the US National Aeronautics and Space Administration (NASA). The MODIS data provides periodic spectral images of the Earth, and includes data from 36 different spectral bands with varying resolution depending upon the band. MODIS data provides pixelated grids, e.g. 135 by 203 pixels with each pixel encompassing a 10 km by 10 km geographical region. The data from certain bands can be used to detect pollution. For example, MODIS data includes aerosol data for a range of pollutants that detrimentally affect the heat exchanger. In another embodiment, at least one vehicle 101 may provide pollution data to the operating center 102. In one embodiment, MODIS provides pollution data that indicates the level of pollution ranging from zero to four, where zero corresponds to no pollution and four corresponds to a very high level of pollution.

In one embodiment, the operations center 102 manipulates the pollution data, e.g. provided by the at least one data source 103 and/or at least one vehicle 101, as will be subsequently described. Regardless of source of the pollution data, the amount of localized pollution in an area of travel of the vehicle is referred to below as a pollution intensity number, ipc.

Figure 2A:
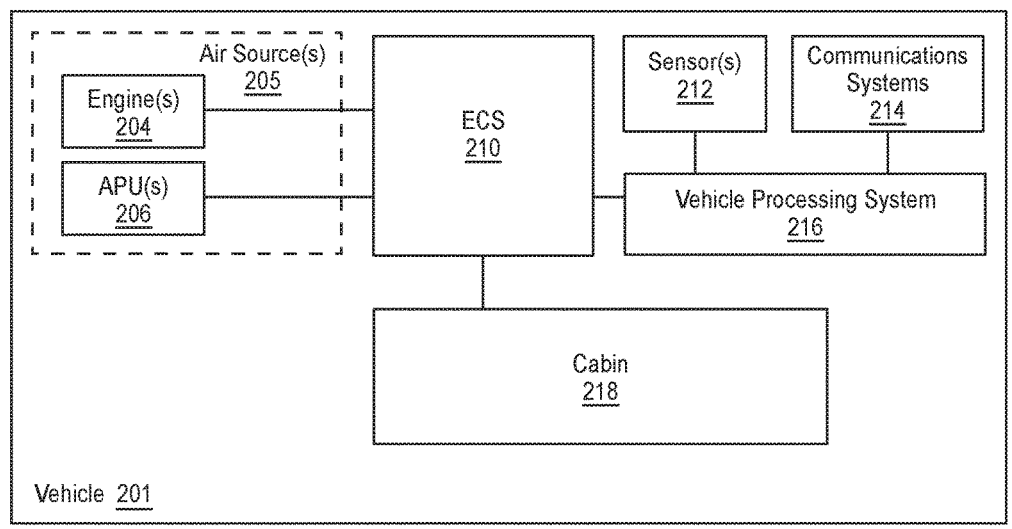
FIG. 2A illustrates a block diagram of an exemplary vehicle configured to extend lifetime of a heat exchanger in the vehicle.

FIG. 2A illustrates a block diagram of an exemplary vehicle 201 configured to extend lifetime of at least one heat exchanger in the vehicle 201. The vehicle 201 includes an environmental control system (ECS) 210, a cabin 281, at least one sensor 212, a vehicle communications system 214, a vehicle processing system 216, and at least one source of air 205.

The at least one source of air (air source(s)) 205, is coupled to the environmental control system 210 and provides air, oxygen, or any oxygen mixture suitable for cabin occupants to breath. Air, oxygen, or any oxygen mixture shall hereinafter be referred to as air. In one embodiment, the at least one source of air 205 includes at least one engine 204, such as a jet engine, that is coupled to the environmental control system 210. In aircraft, typically air is bled from at least one engine is used to provide air to the cabin 218. In another embodiment, the at least one source of air 205 includes at least one auxiliary power unit (APU) 206 coupled to the environmental control system 210. In aircraft, when the engines do not provide sufficient air to the cabin 218, e.g. because they are not activated, air may be bled from at least one auxiliary power unit 206.

The vehicle communications system 214, which is coupled to the vehicle processing system 216, comprises satellite, HF, VHF, cellular, WiFi, WiMax, and/or any other type of communications system, including transceivers and antennas as appropriate. The vehicle communications system 214 facilitates communications through the first communications link 105a between the vehicle 201 and the operations center 102. In one embodiment, pollution data, or commands to the fluid flow regulating mechanism, is communicated from the operations center 102 to the vehicle 201. In another embodiment, temperature data, such as cabin temperature and/or temperature of an exterior of the vehicle 201, and/or pollution data is communicated from the vehicle 201 to the operations center 102.

Figure 2B:
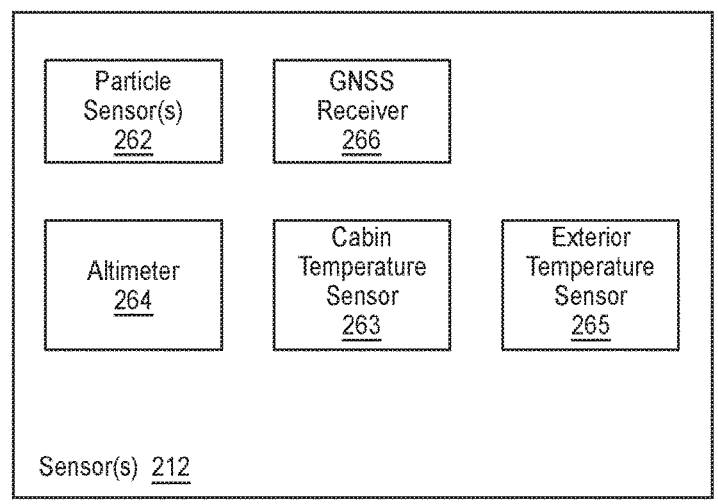
FIG. 2B illustrates an exemplary block diagram of at least one sensor.

The at least one sensor 212 is coupled to the vehicle processing system 216. FIG. 2B illustrates an exemplary block diagram of the at least one sensor 212. In this embodiment, the at least one sensor 212 includes at least one of a cabin temperature sensor 263, an exterior temperature sensor 265, an altimeter 264, a global navigation satellite system (GNSS) receiver 266, and at least one particle sensor 262.

The cabin temperature sensor 263 measures the temperature in the cabin 218. In one embodiment, the vehicle processing system 216 and/or the operations center 102 utilize the temperatures measured by the cabin temperature sensor 263 to ensure that the cabin temperature is maintained at an acceptable level, e.g. at a level that is neither unhealthy nor uncomfortable for the occupants of the cabin. In another embodiment, a healthy and comfortable temperature range is between a minimum temperature and a maximum temperature. Typically, the environmental control system 210 regulates cabin temperature by decreasing or increasing temperature of air provided to the cabin 218.

The exterior temperature sensor 265 measures the temperature on the exterior of the vehicle 201 (exterior temperature), such as the temperature of the fluid flowing from the exterior of the vehicle 201 to the ECS 210. The exterior temperature can limit the ability of the ECS 210 to cool or heat the cabin 218. In one embodiment, the vehicle processing system 216 and/or the operation center 102 utilize the exterior temperatures to determine how to adjust the operation of the environmental control system 210 so that it provides air to the cabin 218 at temperature so that the cabin temperature is maintained at an acceptable level.

The GNSS receiver 266, e.g. a GPS receiver, determines a three-dimensional position of the vehicle 201. The GNSS receiver 266 can indicate when the vehicle 201 has or is about to enter a region with pollutants. In one embodiment, such a region may be a destination terminal, e.g. a destination airport, of the vehicle 201. Further, the GNSS receiver 266 also determines height, e.g. altitude, of the vehicle 201. The height range of location of pollutants can vary by type of pollutants. In another embodiment, the pollutants may be at ground level, e.g. at or below a certain height above a landing terminal, e.g. an airport. For example, for an airport, the pollutants may exist from ground level to about two kilometers above ground level. In a further embodiment, the pollutants may be volcanic ash. For example, the volcanic ash may exist between two to forty-five kilometers above ground level. Thus, height information is also needed to determine if the vehicle 201 is proximate to pollutants. If the operations center 102 or the vehicle processing system 216 determines that the vehicle 201 is proximate to pollutants, one or both can enact measures to reduce the flow of pollutants to the at least one heat exchanger in the environmental control system 210 as will be subsequently described.

The altimeter 264, e.g. a radar altimeter, determines the height of the vehicle 201, e.g. above land. The altimeter 264 can also be used to supplement the GNSS receiver 266 to determine when the vehicle 201 is proximate to pollutants. In one embodiment, it may be used to confirm the altitude determined by the GNSS receiver 266.

In one embodiment, the at least one particle sensor 262 detects the presence, type and density of particles, including pollutants. In one embodiment, the at least one particle sensor 262 is at least one laser particle sensor. One example of a laser particle sensor is disclosed in published U.S. patent application Ser. No. 14/059,165 published on Nov. 6, 2014 with a publication number of US 2014/0330459 A1, which is hereby incorporated by reference in its entirety. In another embodiment, the at least one particle sensor 262 is a radar, such as weather radar.

Returning to FIG. 2A, the environmental control system 210 is coupled to the cabin and provides temperature regulated, conditioned air to the cabin 218. In one embodiment, the environmental control system 210 is coupled to and controlled by the vehicle processing system 216. In another embodiment, the vehicle processing system 216 controls the environmental control system 210.

Figure 3:
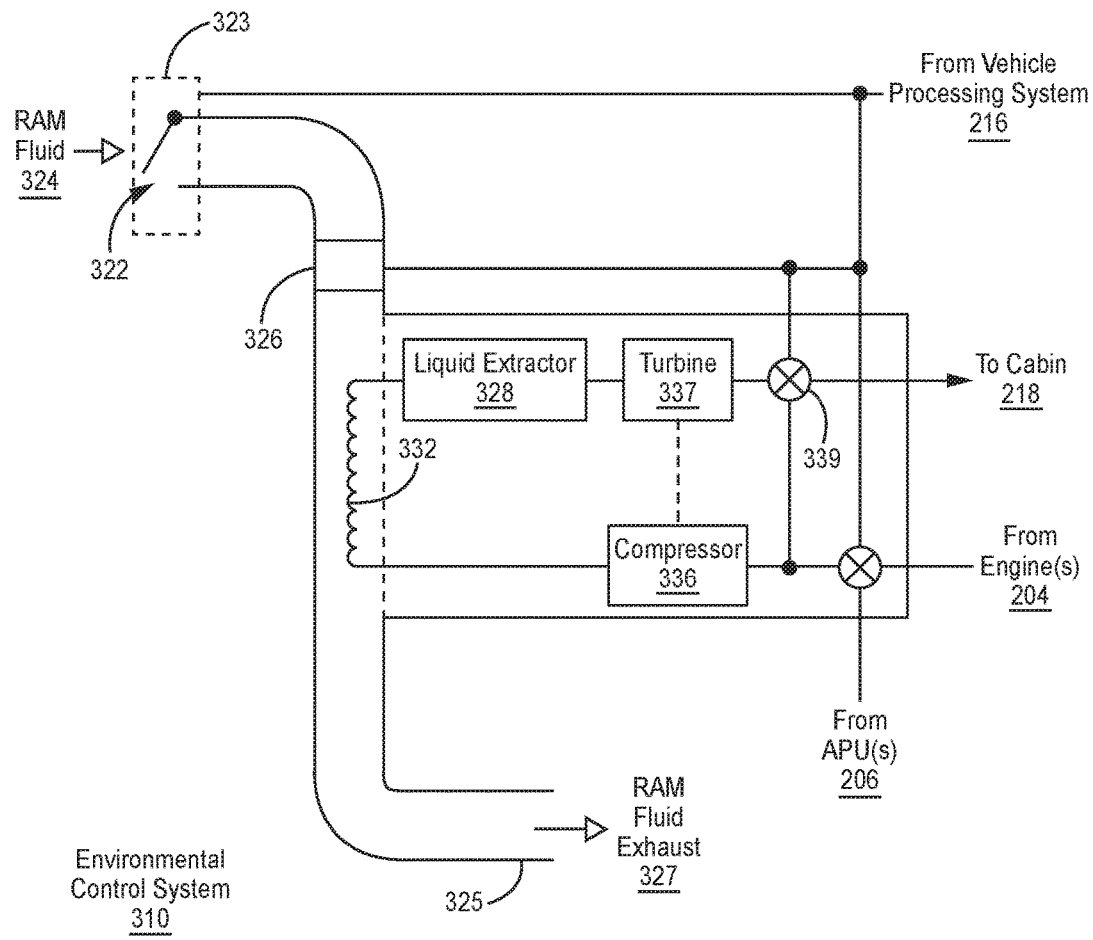
FIG. 3 illustrates a block diagram of an exemplary environmental control system.

FIG. 3 illustrates an exemplary block diagram of an environmental control system 310. The environmental control system 310 includes a ram fluid duct 320 having a ram fluid inlet 322 and a ram fluid egress 325. The invention will be illustrated using the term ram fluid. Conventionally, ram fluid means fluid whose movement is caused by dynamic pressure create by movement of a vehicle. However, as used herein, ram fluid shall apply to any fluid whether or not the fluid movement is caused by dynamic pressure create by movement of a vehicle. As latter discussed, fluid movement can be induced by a fan, propeller, impeller, or any other device that causes fluid movement. The ram fluid may be air, water, or any type of fluid.

In one embodiment, when the vehicle 201 is an aircraft, the ram fluid inlet 322 is located on the wing to body fairing. Ram fluid 324 enters through the ram fluid inlet 322. In a further embodiment, the environmental control system 310 also includes a ram fluid fan 326 which can be activated, e.g. when the vehicle 201 is stationary, to force fluid flow through the ram air duct 320. In yet another embodiment, the ram fluid fan 326 is coupled to the vehicle processing system 216 which controls the speed of the ram fluid fan 326. Ram fluid exhaust 327 exits through the ram fluid egress 325.

A fluid flow regulating mechanism 323 is placed in the ram fluid duct 320. In one embodiment, the fluid flow regulating mechanism 323 is placed in the ram fluid inlet 322. In another embodiment, the fluid flow regulating mechanism 323 is a door or vanes that regulate the amount of fluid flow through the ram fluid duct 320. In a further embodiment, the fluid flow regulating mechanism 323 is controlled electro-mechanically, and is coupled to the vehicle processing system 216; position(s) of the fluid flow regulating mechanism 323 are controlled by the vehicle processing system 216 to vary an amount of ram fluid 324 that flows through the ram fluid duct 320, e.g. to control cooling by the environmental control system 210 and more particularly the at least one heat exchanger 332. In yet another embodiment, the fluid flow regulating mechanism 323 is closed more when the vehicle 201 is proximate to pollutants then when it is not; this restricts the flow of pollutants to at least one heat exchanger 332.

In one embodiment, e.g. for aircraft, air 335 is bled from at least one engine 204 and/or at least one auxiliary power unit 206. The source of the air 335 is selected by a first valve 334. In another embodiment, the first valve 334 is coupled to, and controlled by, the vehicle processing system 216. The vehicle processing system 216 determines a position of the first valve 334, i.e. whether air 335 is bled from the at least one engine 204 and/or from the at least one auxiliary power unit 206.

The air 335 is then compressed by a compressor 336, which increases the temperature of the air 335. The compressed air then circulates through at least one heat exchanger 332. The ram fluid 324 cools the compressed air flowing through the at least one heat exchanger 332.

In one embodiment, liquid such as water may also be created by such cooling. Thus, the cooled, compressed airflows through a liquid extractor 338 which removes all or most of the liquid.

The cooled, compressed air then flows through a turbine 337 which expands the air 335 to cool it further. In one embodiment, the compressor 336 and turbine are coupled, e.g. forming a bootstrap cooling system.

Because the air 335 from the turbine 337 may be too cold for use in the cabin 218, it is then passed through a second valve 339. The second valve 339 is coupled to the original uncooled air 335, and the processing system 216. In one embodiment, the vehicle processing system 216 controls the second valve 339 to mix the cooled air and the original uncooled air to provide air 335 to the cabin 218 at the desired temperature. In another embodiment, if required, a heater can be added, e.g. before or after the second valve 339, to provide additional heating.

Figure 4:
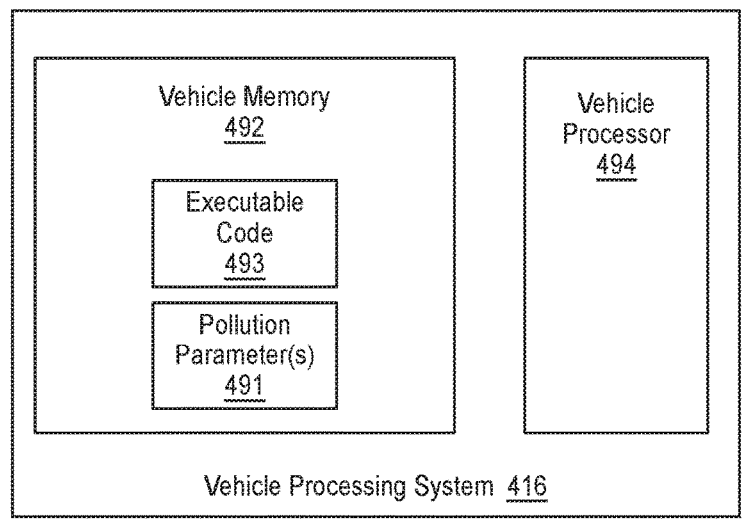
FIG. 4 illustrates a block diagram of an exemplary vehicle processing system.

FIG. 4 illustrates a block diagram of a vehicle processing system 416. In one embodiment, the vehicle processing system 416 is, or is part of, the vehicle management system, e.g. a flight management system, the vehicle management computer, e.g. a flight management computer, or another system on the vehicle 201. The vehicle processing system 416 includes a vehicle memory 492 coupled to a vehicle processor 494. However, the processing system 416 can be otherwise implemented, including with a state machine or a field programmable gate array.

In one embodiment, the vehicle memory 492 includes at least one pollution parameter 491 and executable code 493. In another embodiment, the at least one pollution parameter 491 includes data related to pollutants along the travel path of the vehicle 201. In a further embodiment, the at least one pollution parameter 491 may be stored in a file and/or a database.

In one embodiment, the at least one pollution parameter 491 is at least one command to regulate ram fluid flow to at least one heat exchanger 332 in the vehicle 201. In another embodiment, the commands may be voltage or current levels, or may software instructions.

In one embodiment, the at least one command controls the operation of the fluid flow regulating mechanism 323. In another embodiment, the at least one command corresponds to at least one geographical location, e.g. where a vehicle 101 will be or is travelling through pollutants. In a further embodiment, the at least one pollution parameter 491 is at least one parameter indicative of the position(s) of the fluid flow regulating mechanism 323. In yet another embodiment, the at least one parameter indicative of the position(s) is a percentage of cross-sectional area of the ram fluid duct 320 created by the fluid flow regulating mechanism 323 with respect to the maximum possible cross-section area. In yet a further embodiment, the at least one parameter includes time periods for at least a first position and a second position of the fluid flow regulating mechanism 323. In another embodiment, the first position may be a fully open or partially closed, and the second position may be a partially closed or fully closed position. In a further embodiment, the fluid flow regulating mechanism 323 may be placed in more than two positions.

In one embodiment, the at least one pollution parameter 491 is an indicator, of the level of pollutants at one or more locations, such as the pollution intensity number, and/or settings for the fluid flow regulating mechanism 323 generated by the vehicle processing system 416 or the operating center 102. In another embodiment, the at least one pollution parameter 491 is the pollution intensity number. In a further embodiment, the pollution intensity number ranges from zero to three, where zero is indicative of no pollutants and three is indicative of a maximum number of pollutants. In yet another embodiment, the at least one pollution parameter 491 also includes the location data, e.g. three dimensional coordinates, corresponding to the one or more of the indicator of the level of pollutants such as the pollution intensity number, and/or settings for the fluid flow regulating mechanism 323.

In one embodiment, when the vehicle processing system 416 is provided with the indicator of the level of pollutants such as the pollution intensity number, the executable code 493 executed on the processor 494 determines corresponding commands for the fluid flow regulating mechanism 323, and control ram fluid 324 and pollutant intake. In another embodiment, such commands would then be stored in the memory 492.

In one embodiment, the vehicle processing system 416, e.g. the executable code 493 running on the processor 494, receives the three-dimensional coordinates of the vehicle 201. When the vehicle 201 approaches a geographical region with pollutants, the vehicle processing system 416 communicates with the fluid flow regulating mechanism 323 to reduce the intake of ram fluid 324, and thus pollutants. When the vehicle 201 departs the geographical region with pollutants, the vehicle processing system 416 may communicate with the fluid flow regulating mechanism 323 to increase the intake of ram fluid 324 if the cabin 218 requires further cooling.

Figure 5A:
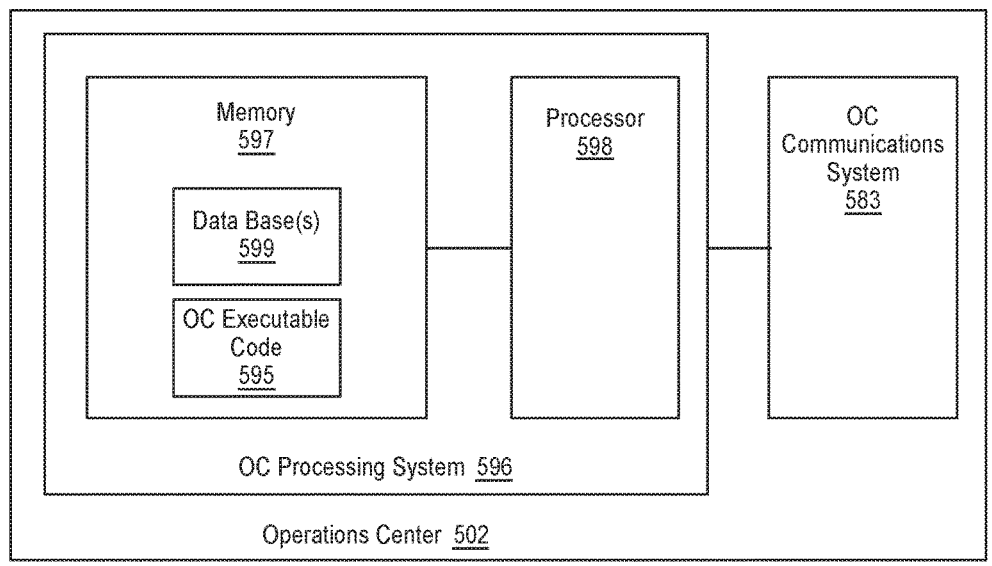
FIG. 5A illustrates a block diagram of an exemplary operations center.

FIG. 5A illustrates a block diagram of an exemplary operations center 502. The operations center 502 includes an operations center processing system 596 coupled to an operations center communications system 583. In one embodiment, the operations center 502 is a cloud computing system.

The operations center communications system 583 comprises a wide area network (such as the Internet), satellite, HF, VHF, cellular telephone, WiFi, WiMax, and/or any other communications system, e.g. including transceivers and antennas as appropriate. In one embodiment, the operations center communications system 583 is configured to communicate through the first communications link 105a with the vehicle 201. In another embodiment, pollution data or control data is communicated from the vehicle communications system 214 and the first communications link 105a to the vehicle 201. In a further embodiment, temperature data, such as cabin temperature and/or temperature of an exterior of the vehicle 201, and/or pollution data is communicated from the vehicle 201 to the operations center 102. In yet another embodiment, the operations center processing system 596 is configured to be coupled to and communicate with the at least one data source, e.g. through the operations center communications system 588 and the second communications link 105b; thus, in this embodiment, the operations center processing system 596 can obtain pollution data for or as the basis for the at least one database such as the at least one pollution database (which are subsequently described).

The exemplary operations center processing system 596 includes a memory 597 coupled to a processor 598. However, the processing system 416 can be implemented otherwise, including with a state machine or a field programmable gate array.

In one embodiment, the memory includes at least one database 599 and operations center (OC) executable code 595. The at least one database 599 can be implemented with one or more databases or other types of data files. In another embodiment, the at least one database 599 includes data about the geographical location of pollutants.

In one embodiment, as will be subsequently described, the operations center executable code 595 transforms pollutant data. In another embodiment, transformed pollutant data is stored in the at least one database 599, and may be provided to a vehicle 101 if its travel path and/or actual location places the vehicle 101 proximate to such pollutants.

Figure 5B:
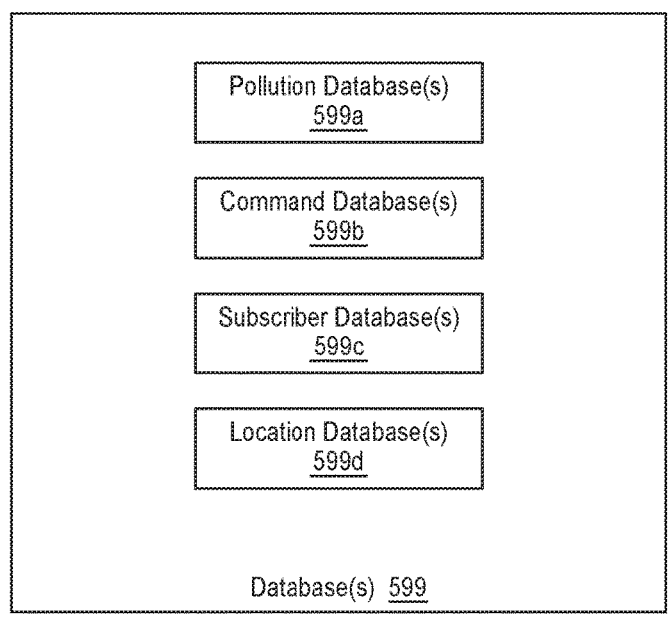
FIG. 5B illustrates a block diagram of an exemplary at least one database.

FIG. 5B illustrates a block diagram of an exemplary at least one database 599. The at least one database includes at least one of at least one of a pollution database 599*a*, at least one of a command database 599*b*, at least one of a subscriber database 599*c*, and at least one of a location database 599*d*.

The at least one pollution database 599*a* includes the geographical location of pollutants. In one embodiment, the at least one pollution database 599*a* also includes at least one characteristic of the pollution at each corresponding geographical location. In another embodiment, the at least on characteristic includes the pollution intensity number.

The at least one command database 599*b* includes, for each vehicle 101 utilizing the services of the operations center, at least one command to control the operation of the fluid flow regulating mechanism 323. In one embodiment, the at least one command database 599*b* includes at least one command for at least one geographical location, e.g. where a vehicle 101 will or is travelling through pollutants. The at least one command database 599*b* only exists and is used in the embodiment where the operations center processing system 596 controls the operation, e.g. the position(s), of the fluid flow regulating mechanism 323 by issuing commands to the fluid flow regulating mechanism 323. In another embodiment, the commands may be voltage or current levels, or may software instructions. In a further embodiment, the at least one command database 599*b* includes the equipment command sets for different types of fluid flow regulating mechanisms 323 used in each vehicle 101 that uses, e.g. subscribes to, the services of the operations center 102.

The at least one subscriber database 599*c* includes the identifiers, e.g. aircraft tail numbers, corresponding to the vehicles 101, operators, e.g. pilots, of the vehicles 101, and/or owners, e.g. airlines, of the vehicles 101 that subscribe to the services provided by the operations center 102. In one embodiment, the at least one subscriber database 599*c* is only used when the services of the operations center 102 are provided on a subscription basis, e.g. where the subscribers pay a periodic payment to obtain such services.

The at least one location database 599*d* includes the location of at least one vehicle 101 that are using the services of the operations center 102, e.g. subscribers. In one embodiment, the at least one location database 599*d* includes travel plan of the at least one vehicle 101, e.g. that are will and/or are travelling. In another embodiment, the at least one location database 599*d* includes the present location of the at least one vehicle 101. In yet a further embodiment, the at least one location database 599*d* includes both the travel plans and present locations of the at least one vehicle 101.

Returning to FIG. 5A, in one embodiment, the operations center processing system 596 receives data from one or more data sources 103, such as MODIS. Such data is stored in the at least one pollution database 599*a*. In another embodiment, because such data may not be provided in real time, i.e. may hours or even more than one day old, and may be for geographical regions that do not match exactly to geographical regions through which the at least one vehicle 101 will travel, such data may be extrapolated with respect to time, and/or interpolated with respect to geographical region, to improve accuracy. In a further embodiment, prior or subsequent to such extrapolation and/or interpolation the pollution data is transformed into pollution intensity numbers if it is not already in such a format.

In one embodiment, pollution data corresponding to vehicle travel paths and/or locations is communicated to the at least one vehicle 101 over the first communications link 105*a*. In another embodiment, the operations center executable code 595 periodically generates commands for each of the at least one vehicle 101 with which to manipulate the fluid flow regulating mechanism 323 of each of the at least one vehicle 101.

Figure 6:
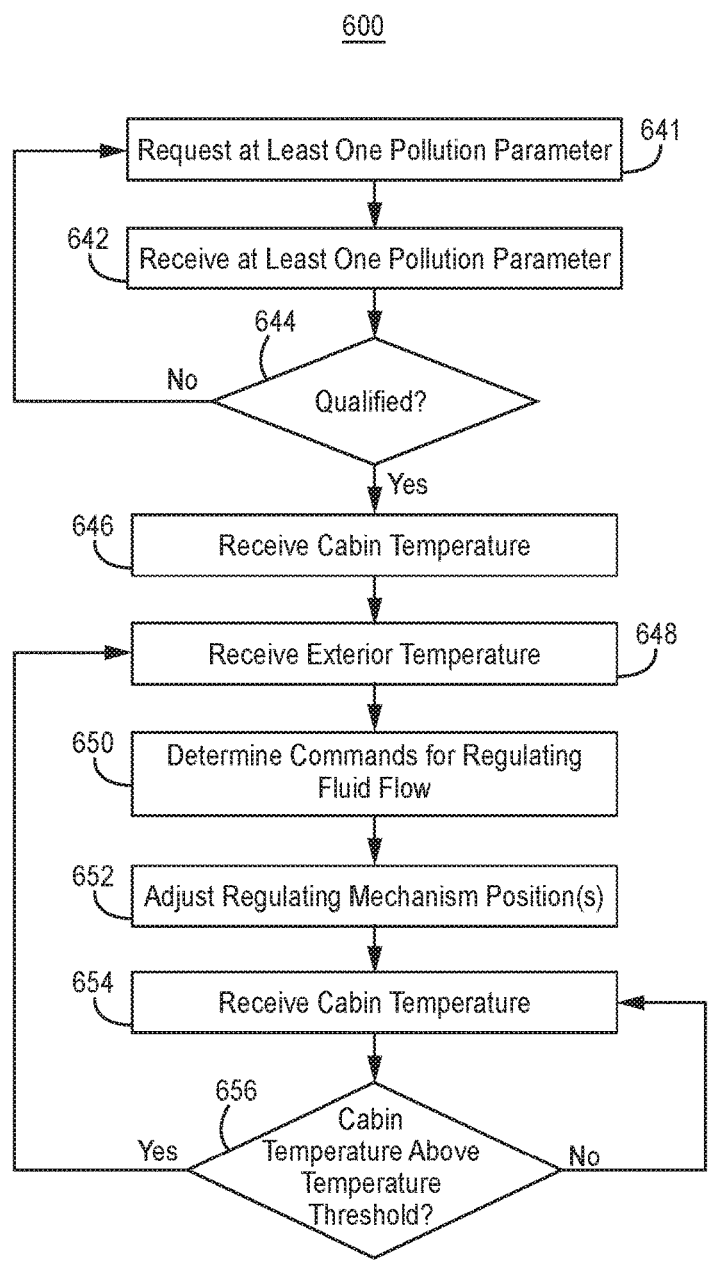
FIG. 6 illustrates one embodiment of a method for a vehicle to regulate amount of pollutants flowing into an environmental control system.

FIG. 6 illustrates one embodiment of a method 600 for a vehicle 101 to regulate amount of pollutants flowing into an environmental control system 310, e.g. into at least one heat exchanger 332. To the extent that the embodiment of method 600 shown in FIG. 6 is described herein as being implemented in the systems shown in FIGS. 1 through 5B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In one embodiment, in block 641, the vehicle 101 requests at least one pollution parameter 491, e.g. from the operations center 102. In another embodiment, the at least one pollution parameter 491 is requested from the operations center 102 through the first communications link 105*a* using the vehicle communications system 214. In a further embodiment, when the vehicle 101 makes the request, it provides information to validate that it is a subscriber.

In block 642, the vehicle 101 receives at least one pollution parameter 491. In one embodiment, the at least one pollution parameter 491 is received via the vehicle communications system 214 from the operations center 102 through the first communications link 105*a* using the vehicle communications system 214. In another embodiment, at least one pollution parameter 491 is received from the at least one particle sensor 262 on the vehicle 101. In a further embodiment, at least one pollution parameter 491 is be received from both the operations center 102 and the at least one particle sensor 262.

In one embodiment, the at least one pollution parameter 491 is only received when the vehicle 101 is on the ground, e.g. at a terminal such as an airport; during travel, the vehicle 101 uses cached pollution data (for example at least one pollution parameter 491) received by the vehicle 101 before it began its travels, and to be used during its travels. In another embodiment, such cached pollution data may include commands and/or pollution data, and corresponding geographic locations. In a further embodiment, such cached pollution data may be stored in the vehicle memory 492.

In one embodiment, in block 644, the at least one pollution parameter 491 is qualified. In another embodiment, qualification entails ensuring that the at least one pollution parameter 491, e.g. from the operations center 102 and/or the at least one particle sensor 262, is within expected ranges. For example, if the at least one pollution parameter 491 is indicative of position(s) of the fluid flow regulating mechanism 323, the at least one pollution parameter 491 is evaluated so, if used, that it will not cause discomfort or detrimental health affects to the occupants of the cabin 218 because the flow of ram fluid 324 in the ram duct 320 would be too restricted by the fluid flow regulating mechanism 323. In a further embodiment, if the at least one pollution parameter 491 includes pollution data from both the at least one particle sensor 262 and the operations center 102, such pollution data is compared; only if the difference in pollution data from both sources is within acceptable limits, is such pollution data qualified. If the at least one pollution parameter 491 is deemed unqualified, then the at least one pollution parameter 491 is rejected and not used. In yet another embodiment, if the at least one pollution parameter 491 is deemed unqualified, then return to block 641.

In one embodiment, in block 646, the cabin temperature is received, e.g. by the vehicle processing system 216 from the cabin temperature sensor 263. In another embodiment, in block 648, the external temperature is received, e.g. by the vehicle processing system 216 from the exterior temperature sensor 265.

In one embodiment, in block 650, if the at least one pollution parameter 491 is a parameter indicative of the number of pollutants parameters, then, determine, e.g. with the vehicle processing system 216, commands for regulating ram fluid flow, e.g. with the fluid flow regulating mechanism 323, to at least one heat exchanger 332 in a vehicle 201. The parameters for regulating ram fluid flow are based upon the at least one pollution parameter 491. In another embodiment, the commands may be voltage or current levels, or may software instructions.

In one embodiment, the at least one pollution parameter 491 is a parameter indicative of the number of pollutants, e.g. the pollution intensity number. In another embodiment, if the pollution intensity number is less than one, then close the mechanism fully for two seconds, then open the door for sixty seconds, and repeat the foregoing sequence. If the pollution intensity number less than two but equal or greater than one, then close the mechanism fully for three seconds, then open the door for sixty seconds, and repeat the foregoing sequence. If the pollution intensity number is equal to or greater than two, then then close the mechanism fully for fifteen seconds, then open the door for sixty seconds, and repeat the foregoing sequence. However, in other embodiments, it is envisioned that the times for opening and closing the mechanism may differ, including because they would be based upon cabin temperature and exterior temperature.

In block 652, adjust a position(s) of the fluid flow regulating mechanism 323 based upon the at least one pollution parameter 491, e.g. the commands for regulating fluid flow in block 650, or commands externally provided, e.g. by the operations center 102, in block 642. In one embodiment, override the normal operation of the fluid flow regulating mechanism 323.

In block 654, the cabin temperature is received, e.g. by the vehicle processing system 216 from the at least one sensor 212. In one embodiment, in block 656, determine if the cabin temperature is above a temperature threshold. In another embodiment, such a temperature threshold is a temperature which is uncomfortable and/or unhealthy for cabin occupants. If yes, in a further embodiment, then return to either block 648 or 650, and adjust at least one fluid flow regulating mechanism position in view of the cabin temperature so that it reaches a level that is comfortable and healthy. If the cabin temperature is below the temperature threshold, then return to block 654.

Figure 7:
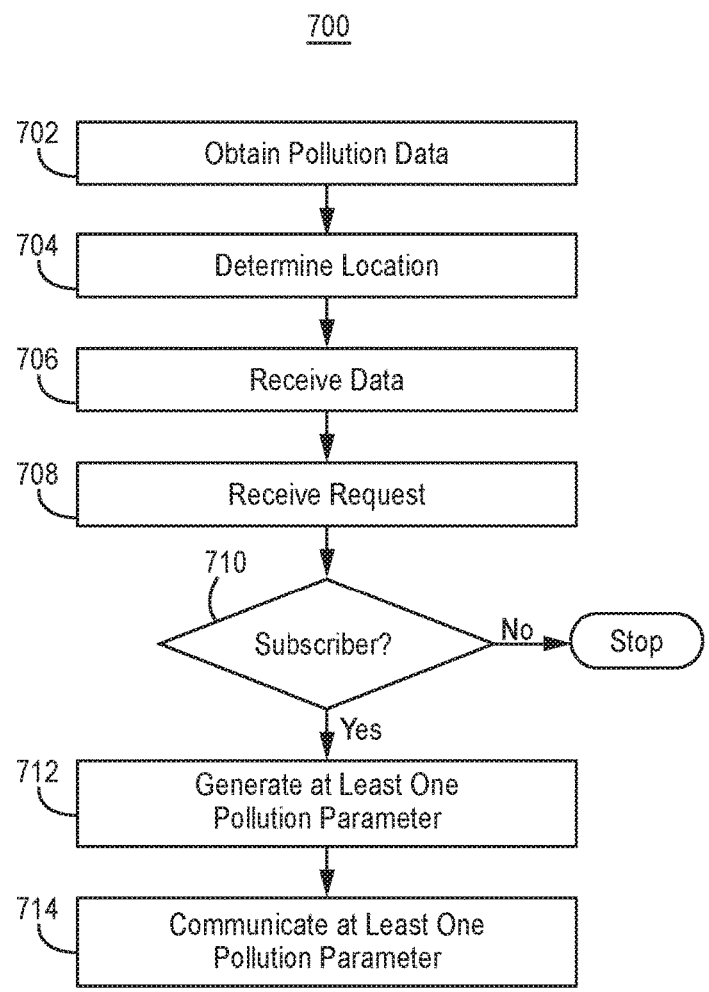
FIG. 7 illustrates one embodiment of a method for generating and communicating at least one pollution parameter.

FIG. 7 illustrates one embodiment of a method 700 for generating and communicating at least one pollution parameter 491. In block 702, obtain pollution data, e.g. from the at least data source 103 such as MODIS. In block 704, determine a location of at least one vehicle 101. In one embodiment, the at least one vehicle is a subscriber.

In one embodiment, in block 706 receive data from the at least one vehicle, such as cabin temperature and/or exterior temperature of the at least one vehicle 101, or pollution data measured by the at least one vehicle.

In one embodiment, in block 708, receive a request from at least one vehicle 101 for at least one pollution parameter. In another embodiment, the vehicle 101 may automatically make such requests when parked at a terminal (e.g. an airport), when preparing for departure (e.g. taxiing), during departure (e.g. takeoff), when preparing for arrival (e.g. on approach), during arrival (e.g. landing), and/or when preparing to park (e.g. taxiing).

In one embodiment, in block 710, determine whether the at least one vehicle 101 is a subscriber e.g. in response to the request for the at least one pollution parameter. If the at least one vehicle 101 is a subscriber, proceed to block 710, else stop.

In block 712, generate at least one pollution parameter 491. In one embodiment, this includes performing extrapolation with respect to time, and/or interpolation with respect to geographical region to improve accuracy of the at least one pollution parameter 491. In another embodiment, the pollution data is transformed into pollution intensity numbers and/or into at least one command. In a further embodiment, the at least one pollution parameter 491 is configured to regulate an intake of pollutants into an environmental control system 210 of a vehicle 201.

In block 714, communicate to a vehicle at least one pollution parameter 491 configured to regulate the intake of pollutants into the environmental control system of the vehicle, e.g. regulate fluid flow to at least one heat exchanger, and/or alert the operator of the vehicle 101. In one embodiment, communicate at least one pollution parameter 491 when the vehicle is proximate to pollutants. In another embodiment, communicate a set of pollution parameters corresponding to the locations on the travel path of the vehicle where the vehicle will be proximate to pollutants. In a further embodiment, the at least one pollution parameter 491 is at least one set of data related to pollution along the travel path of the vehicle and/or at least one command to be used by the vehicle 101 during travel along the travel path.

Example Embodiments

Example 1 includes a system, comprising: a ram duct; a fluid flow regulating mechanism coupled to the ram duct and configured to be coupled to a processing system; at least one heat exchanger coupled to the ram duct; wherein air flowing through the at least one heat exchanger is cooled by ram fluid flowing through the ram duct; wherein the at least one heat exchanger is configured to be coupled to a cabin; and wherein the fluid flow regulating mechanism is configured to regulate the amount of ram fluid flowing through the ram duct based upon at least one pollution parameter.

Example 2 includes the system of Example 1, further comprising the processing system; and at least one sensor, coupled to the processing system, comprising at least one of: at least one particle sensor, a global navigation satellite system receiver, an altimeter, a cabin temperature sensor, and an exterior temperature sensor.

Example 3 includes the system of Example 2, further comprising a communications system coupled to the processing system; and wherein the communications system is configured to receive the at least one pollution parameter from an operations center.

Example 4 includes the system of any of Examples 1-3, further comprising a compressor coupled to the at least one heat exchanger; and a turbine coupled to the at least one heat exchanger.

Example 5 includes the system of any of Examples 1-4, further comprising a ram fluid fan in the ram duct.

Example 6 includes a method, comprising: receiving, in a vehicle, at least one pollution parameter; and adjusting at least one fluid flow regulating mechanism position, to regulate an intake of pollutants into an environmental control system of the vehicle, based upon the at least one pollution parameter.

Example 7 includes the method of Example 6, wherein receiving, in the vehicle, the at least one pollution parameter comprises receiving, in the vehicle, the at least one pollution parameter from at least one of an operations center, and at least one particle sensor of the vehicle.

Example 8 includes the method of any of Examples 6-7, further comprising determining commands for the intake of the pollutants into the environmental control system of the vehicle.

Example 9 includes the method of any of Examples 6-8, further comprising determining if the at least one pollution parameter is qualified.

Example 10 includes the method of any of Examples 6-9, further comprising receiving cabin temperature.

Example 11 includes the method of Example 10, further comprising determining if the cabin temperature is above a temperature threshold.

Example 12 includes the method of any of Examples 6-11, further comprising receiving exterior temperature.

Example 13 includes the method of any of Examples 6-12, receiving, in a vehicle, at least one pollution parameter from at least one of an operations center, and at least one particle sensor of the vehicle wherein receiving, in the vehicle at the least one pollution parameter from at the operations center when the vehicle is not travelling.

Example 14 includes an operations center, comprising: an operations center communications system; an operations center processing system coupled to the operations center communications system; wherein the operations center processing system is configured to generate at least one at least one pollution parameter; and wherein the operations center communications system is configured to communicate the at least one pollution parameter to a vehicle so that the vehicle can regulate the intake of pollutants into an environmental control system of the vehicle.

Example 15 includes the operations center of Example 14, wherein the at least one pollution parameter comprises at least one of: data related to pollution along a travel path of the vehicle, and at least one command to regulate ram fluid flow to at least one heat exchanger in the vehicle.

Example 16 includes the operations center of Example 14, wherein the operations center processing system is configured to be coupled to at least one data source.\Example 17 includes a method, comprising: obtaining pollution data; determining the location of a vehicle; generating at least one pollution parameter; and communicating, to the vehicle, at least one pollution parameter configured to do at least one of: regulate the intake of pollutants into the environmental control system of the vehicle, and alert an operator of the vehicle.

Example 18 includes the method of Example 17, wherein the at least one pollution parameter comprises at least one of data related to pollution, and at least one command.

Example 19 includes the method of any of Examples 17-18, further comprising receiving a request for pollution data from the vehicle.

Example 20 includes the method of any of Example 17-19, further comprising determining if a vehicle is a subscriber.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A fluid flow regulating system of a vehicle, the system comprising:
    a ram duct configured to accept fluid flow into the vehicle;
    a fluid flow regulating mechanism coupled to the ram duct and coupled to a processing system of the vehicle; and
    at least one heat exchanger coupled to a cabin of the vehicle and the ram duct and configured to cool air flowing through the at least one heat exchanger using ram fluid flowing through the ram duct;
    wherein the fluid flow regulating mechanism is controlled by the processing system of the vehicle to adjust a size of an opening of the ram duct to regulate the amount of ram fluid flowing through the ram duct based upon at least one pollution parameter.

2. The system of claim 1, further comprising the processing system; and
    at least one sensor, coupled to the processing system, comprising at least one of: at least one particle sensor, a global navigation satellite system receiver, an altimeter, a cabin temperature sensor, and an exterior temperature sensor.

3. The system of claim 2, further comprising a communications system coupled to the processing system; and
    wherein the communications system is configured to receive the at least one pollution parameter from an operations center.

4. The system of claim 1, further comprising a compressor coupled to the at least one heat exchanger; and
    a turbine coupled to the at least one heat exchanger.

5. The system of claim 1, further comprising a ram fluid fan in the ram duct.

6. A method, comprising:
    receiving, in a vehicle, at least one pollution parameter; and
    adjusting, by at least one fluid flow regulating mechanism, a size of an intake opening based upon the at least one pollution parameter to regulate an amount of intake of pollutants into an environmental control system of the vehicle.

7. The method of claim 6, wherein receiving, in the vehicle, the at least one pollution parameter comprises receiving, in the vehicle, the at least one pollution parameter from at least one of an operations center, and at least one particle sensor of the vehicle.

8. The method of claim 6, further comprising determining commands for the intake of the pollutants into the environmental control system of the vehicle.

9. The method of claim 6, further comprising determining if the at least one pollution parameter is qualified.

10. The method of claim 6, further comprising receiving cabin temperature.

11. The method of claim 10, further comprising determining if the cabin temperature is above a temperature threshold.

12. The method of claim 6, further comprising receiving exterior temperature.

13. The method of claim 6, receiving, in a vehicle, while the vehicle is stationary at least one pollution parameter from at least one of an operations center, or at least one particle sensor of the vehicle.

14. An operations center, comprising:
an operations center communications system;
an operations center processing system coupled to the operations center communications system;
wherein the operations center processing system is configured to generate at least one pollution parameter; and
wherein the operations center communications system is configured to communicate the at least one pollution parameter to a vehicle to prompt the vehicle to adjust a size of an intake opening to regulate the intake of pollutants into an environmental control system of the vehicle.

15. The operations center of claim 14, wherein the at least one pollution parameter comprises at least one of: data related to pollution along a travel path of the vehicle, and
at least one command to regulate ram fluid flow to at least one heat exchanger in the vehicle.

16. The operations center of claim 14, wherein the operations center processing system is configured to be coupled to at least one data source.

17. A method, comprising:
obtaining pollution data;
determining the location of a vehicle;
generating at least one pollution parameter; and
communicating, to the vehicle, at least one pollution parameter configured to adjust a size of an intake opening to do at least one of: regulate the intake of pollutants into the environmental control system of the vehicle, and alert an operator of the vehicle.

18. The method of claim 17, wherein the at least one pollution parameter comprises at least one of data related to pollution, and at least one command.

19. The method of claim 17, further comprising receiving a request for pollution data from the vehicle.

20. The method of claim 17, further comprising determining if a vehicle is a subscriber.

* * * * *